US012541195B2

(12) United States Patent
Shao

(10) Patent No.: US 12,541,195 B2
(45) Date of Patent: Feb. 3, 2026

(54) METHODS, SYSTEMS, AND STORAGE MEDIA FOR ASSEMBLY QUALITY CONTROL BASED ON INDUSTRIAL INTERNET OF THINGS (IIoT)

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/001,376

(22) Filed: Dec. 24, 2024

(65) Prior Publication Data

US 2025/0130559 A1 Apr. 24, 2025

(30) Foreign Application Priority Data

Nov. 25, 2024 (CN) .......................... 202411686939.8

(51) Int. Cl.
G05B 19/418 (2006.01)
(52) U.S. Cl.
CPC ............... G05B 19/41875 (2013.01); *G05B 2219/32194* (2013.01); *G05B 2219/32368* (2013.01); *G05B 2219/40111* (2013.01)
(58) Field of Classification Search
None
See application file for complete search history.

(56) References Cited

U.S. PATENT DOCUMENTS 8,875,150 B2 * 10/2014 Ferdous .............. G06F 11/3409
709/224
9,729,639 B2 * 8/2017 Sustaeta ................ H04L 67/125
(Continued)

FOREIGN PATENT DOCUMENTS

CN  108388146 A  8/2018
CN  109711714 A  5/2019
(Continued)

OTHER PUBLICATIONS

First Office Action in Chinese Application No. 202411686939.8 mailed on Jan. 9, 2025, 21 pages.
(Continued)

*Primary Examiner* — Jason Lin
(74) *Attorney, Agent, or Firm* — PORUS IP LLC

(57) ABSTRACT

Provide are a method, an IIoT system, and a storage medium for assembly quality control. The method includes: obtaining quality inspection information of a plurality of parts to be assembled; determining, based on the quality inspection information and assembly information, an assembly risk value of each of at least one assembly process through an assembly database; generating a first assembly parameter in response to determining that the assembly risk value satisfies a risk condition; obtaining assembly process data of an assembly operation based on a monitoring device; determining assembly quality of a completed process; in response to determining that the assembly quality does not satisfy a quality requirement, determining a second assembly parameter; generating quality warning information based on the assembly quality and the second assembly parameter; and generating, based on the completed process, quality update data for updating the assembly database.

8 Claims, 4 Drawing Sheets

(56) References Cited

U.S. PATENT DOCUMENTS

| | | | |
|---|---|---|---|
| 11,138,570 B1* | 10/2021 | Leise | G07C 5/0808 |
| 2003/0216930 A1* | 11/2003 | Dunham | G06Q 30/02 |
| | | | 705/14.69 |
| 2005/0209724 A1* | 9/2005 | Hoppes | G05B 19/4184 |
| | | | 700/109 |
| 2008/0128642 A1* | 6/2008 | Mos | G03F 7/70525 |
| | | | 250/492.22 |
| 2008/0294281 A1* | 11/2008 | Shimshi | G06Q 50/04 |
| | | | 700/110 |
| 2011/0061015 A1* | 3/2011 | Drees | H02J 13/00016 |
| | | | 700/275 |
| 2011/0224918 A1* | 9/2011 | Floeder | G01N 21/8922 |
| | | | 702/35 |
| 2012/0159367 A1* | 6/2012 | Calcaterra | G06F 11/3024 |
| | | | 718/104 |
| 2017/0006135 A1* | 1/2017 | Siebel | G06F 8/24 |
| 2018/0024543 A1* | 1/2018 | Kitamura | G06Q 10/06 |
| | | | 700/44 |
| 2018/0189939 A1* | 7/2018 | Ghidotti Piovan | G06T 7/12 |
| 2019/0114756 A1 | 4/2019 | Weiss et al. | |
| 2019/0273784 A1* | 9/2019 | Shao | H04W 84/04 |
| 2020/0089214 A1 | 3/2020 | Cella et al. | |
| 2020/0156915 A1* | 5/2020 | Hofmann | G05B 19/409 |
| 2022/0187847 A1* | 6/2022 | Cella | G06Q 10/06395 |

FOREIGN PATENT DOCUMENTS

| | | |
|---|---|---|
| CN | 109978403 A | 7/2019 |
| CN | 110073301 A | 7/2019 |
| CN | 116720786 A | 9/2023 |
| CN | 118605380 A | 9/2024 |
| CN | 118884883 A | 11/2024 |

OTHER PUBLICATIONS

Notification to Grant Patent Right for Invention in Chinese Application No. 202411686939.8 mailed on Feb. 21, 2025, 6 pages.

Luo, Zhenwei et al., Aircraft Digital Preassembly Technology Based on Measured Data, Aeronautical Manufacturing Technology, 20, 2013, 5 pages.

* cited by examiner

METHODS, SYSTEMS, AND STORAGE MEDIA FOR ASSEMBLY QUALITY CONTROL BASED ON INDUSTRIAL INTERNET OF THINGS (IIoT)

CROSS-REFERENCE TO RELATED APPLICATIONS

This application claims priority to Chinese Patent Application No. 202411686939.8, filed on Nov. 25, 2024, the entire content of which is hereby incorporated by reference.

TECHNICAL FIELD

The present disclosure relates to the field of assembly manufacturing, and in particular relates to a method, an Industrial Internet of Things (IIoT) system, and a storage medium for assembly quality control based on IIoT.

BACKGROUND

In the modern manufacturing industry, the assembly production line is a key link in realizing efficient, mass production of products. In the actual process of parts assembly, due to factors such as fluctuations in the quality of parts, assembly quality is difficult to control. Existing assembly quality control methods are still deficient in the prediction and warning of abnormal risks.

Therefore, it is desired to provide a system, and a storage medium for assembly quality control based on IIoT to efficiently analyze and predict abnormal risks that may occur in the process of assembling, and give timely warnings or safety recommendations to realize efficient and safe product production.

SUMMARY

One or more embodiments of the present disclosure provide a method for assembly quality control based on IIoT. The method is executed by an IIoT management platform of an IIoT system for assembly quality control. The method may include: obtaining, based on an IIoT sensing network platform, quality inspection information of a plurality of parts to be assembled through a quality inspection device of an IIoT sensing and control platform; determining, based on the quality inspection information and assembly information, an assembly risk value of each of at least one assembly process through an assembly database, the assembly database being configured in a data center of the IIoT management platform; generating a first assembly parameter in response to determining that the assembly risk value satisfies a risk condition; sending the first assembly parameter to an operation device of the IIoT sensing and control platform, and controlling the operation device to perform an assembly operation on the plurality of parts to be assembled based on the first assembly parameter; obtaining assembly process data of the assembly operation based on a monitoring device of the IIoT sensing and control platform; determining assembly quality of a completed process based on the assembly process data; in response to determining that the assembly quality does not satisfy a quality requirement, determining a second assembly parameter based on the assembly quality, and sending the second assembly parameter to a subsequent operation device of the IIoT sensing and control platform and controlling the subsequent operation device to perform the assembly operation based on the second assembly parameter; generating quality warning information based on the assembly quality and the second assembly parameter, and sending the quality warning information to an IIoT user platform based on an IIoT service platform; and generating, based on the completed process, quality update data for updating the assembly database.

One or more embodiments of the present disclosure provide an Industrial Internet of Things (IIoT) system for assembly quality control. The IIoT system may include an IIoT user platform, an IIoT service platform, an IIoT management platform, an IIoT sensing network platform, and an IIoT sensing and control platform. The IIoT management platform may be configured to: obtain, based on the IIoT sensing network platform, quality inspection information of a plurality of parts to be assembled through a quality inspection device of the IIoT sensing and control platform; determine, based on the quality inspection information and assembly information, an assembly risk value of each of at least one assembly process through an assembly database, the assembly database being configured in a data center of the IIoT management platform; generate a first parameter in response to determining that the assembly risk value satisfies a risk condition; send the first parameter to an operation device of the IIoT sensing and control platform, and control the operation device to perform an assembly operation on the plurality of parts to be assembled based on the assembly parameter; obtain assembly process data of the assembly operation based on a monitoring device of the IIoT sensing and control platform; determine assembly quality of a completed process based on the assembly process data; in response to determining that the assembly quality does not satisfy a quality requirement, determine a second assembly parameter based on the assembly quality, and send the second assembly parameter to a subsequent operation device of the IIoT sensing and control platform and control the subsequent operation device to perform the assembly operation based on the second assembly parameter; generate quality warning information based on the assembly quality and the second assembly parameter, and send the quality warning information to the IIoT user platform based on the IIoT service platform; and generate, based on the completed process, quality update data for updating the assembly database.

One or more embodiments of the present disclosure provide a non-transitory computer-readable storage medium that stores computer instructions, and when a computer reads the computer instructions in the storage medium, the computer implements the method for assembly quality control based on IIoT described in the present disclosure.

Beneficial effects brought about by one or more embodiments of the present disclosure include, but are not limited to: (1) being able to predict the likelihood of nonconforming assembly quality, thereby determining assembly parameters that result in higher assembly quality, which allows for timely warnings or adjustments to assembly parameters based on instances of assembly quality defects, achieving efficient and safe production of products; (2) clustering the same type of parts based on quality inspection information to divide the parts into multiple subsets, which may then be combined in various ways to form multiple candidate assembly groups, thereby reducing data volume and improving the efficiency of determining candidate assembly groups; (3) determining the predicted assembly quality using quality inspection information from a plurality of parts to be assembled from the candidate assembly groups, which enables the prediction of the assembly quality for each candidate assembly group and the determination of assembly risk values based on the predicted assembly quality of each group. This results in a more broadly applicable and potentially more significant assembly risk value, allowing for accurate assessment of whether the assembly risk value meets risk conditions.

BRIEF DESCRIPTION OF THE DRAWINGS

The present disclosure will be further illustrated by way of exemplary embodiments, which will be described in detail through the accompanying drawings. These embodiments are not limiting, and in these embodiments, the same numbering denotes the same structure, wherein.

DETAILED DESCRIPTION

Figure 1:
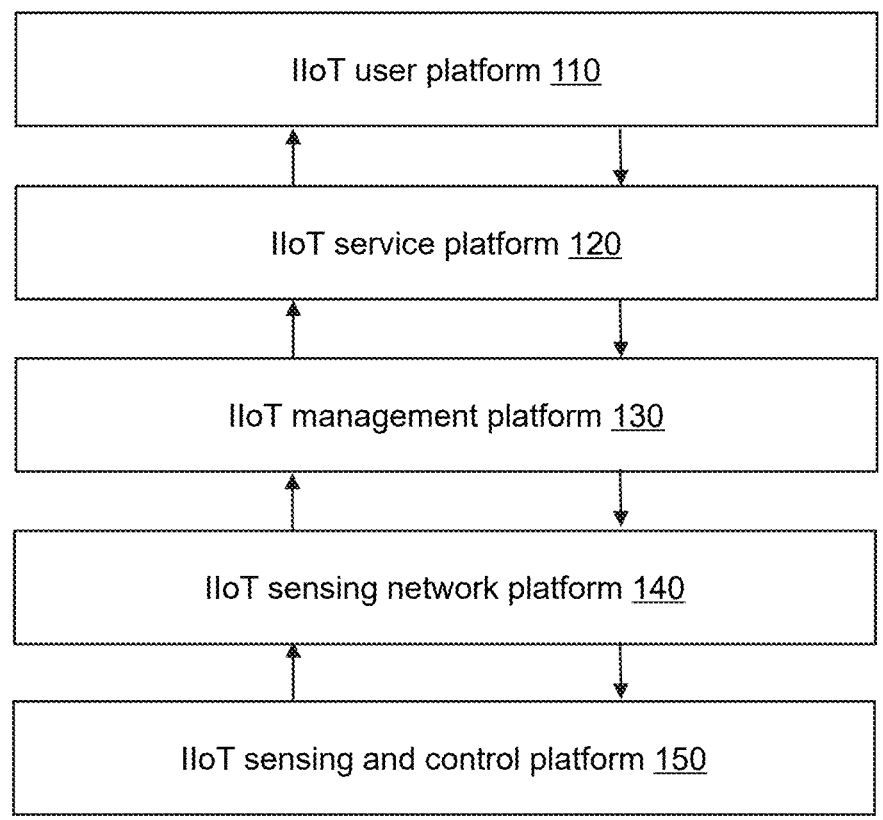
FIG. 1 is a block diagram of an exemplary IIoT system for assembly quality control according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a block diagram of an exemplary IIoT system for assembly quality control according to some embodiments of the present disclosure.

As shown in FIG. 1, an IIoT system 100 for assembly quality control (hereinafter referred to as the IIoT system 100) includes an IIoT user platform 110, an IIoT service platform 120, an IIoT management platform 130, an IIoT sensing network platform 140 and an IIoT sensing and control platform 150.

The IIoT user platform refers to a platform for interacting with a user. In some embodiments, the IIoT user platform is configured as a terminal device and/or a terminal interface, etc. The terminal device includes a mobile device, a tablet computer, etc. The terminal interface includes a terminal device interface, a web page, etc.

The IIoT service platform refers to a platform that provides information and services to the user. In some embodiments, the IIoT service platform is configured on a local server. The IIoT service platform may interact with the IIoT user platform and the IIoT management platform.

The IIoT management platform refers to a platform that manages information and/or data related to the IIoT system 100. In some embodiments, the IIoT management platform includes a processor, a storage device, etc. The storage device stores a data center, which includes a plurality of databases. Databases refer to database management systems that support highly concurrent access. The processor may include a central processing unit (CPU), an application specific integrated circuit (ASIC), an application specific instruction processor (ASIP), a graphics processor (GPU), or the like, or any combination thereof.

The IIoT sensing network platform refers to a platform for integrated management of sensing information. In some embodiments, the IIoT sensing network platform is configured as a communication network, a gateway and a network interface, or the like. The IIoT sensing network platform may interact with the IIoT management platform and the IIoT sensing and control platform.

The IIoT sensing and control platform refers to a functional platform for sensing information generation and control information execution. In some embodiments, the IIoT sensing and control platform includes an operation device, a quality inspection device, a monitoring device, or the like.

The operation device is a device configured to accomplish an assembly operation, for example, an automated assembly machine, or the like.

The quality inspection device is a device configured to obtain quality inspection information of parts to be assembled, for example, a coordinate measuring machine, a motorized profiler, or the like.

The parts to be assembled refer to parts to be assembled to obtain a finished product.

The monitoring device refers to a device that obtains data of an assembly process. In some embodiments, the monitoring device includes a temperature sensor, a humidity sensor, a radio frequency identification (RFID) device, a code scanning gun, a torque sensor, a displacement sensor, a machine vision inspection device, or the like.

The RFID device, the scanning gun, etc., are used to read electronic tags of the parts to be assembled and to obtain quality inspection information of the parts to be assembled. Torque sensor is used to obtain a torque exerted by the operation device during an assembly operation. The displacement sensor is used to obtain a relative displacement between the parts to be assembled during the assembly operation. The machine vision inspection device is used to obtain dimensional data of finished or semi-finished products after assembly is completed.

Figure 2:
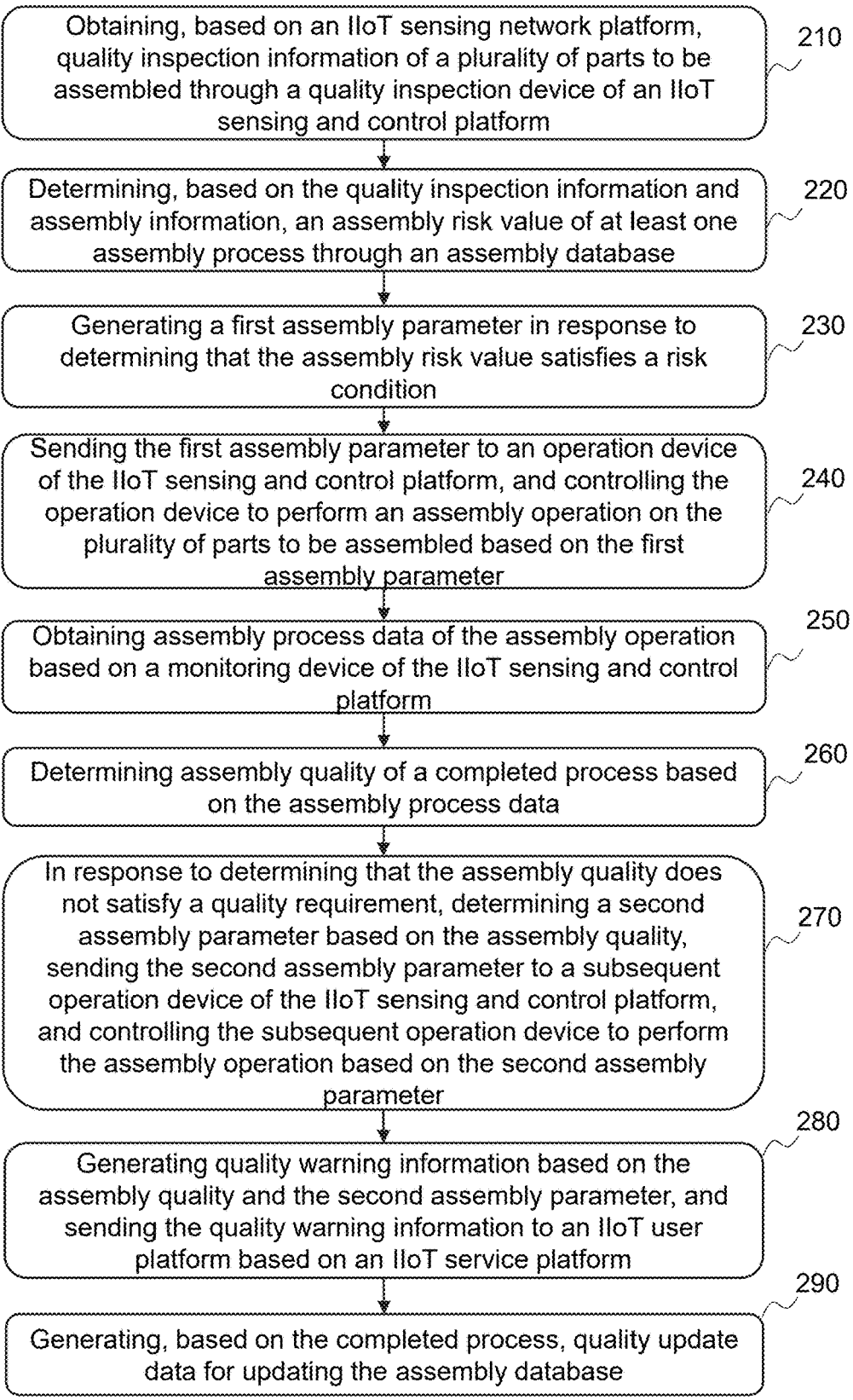
FIG. 2 is a flowchart of an exemplary process of a method for assembly quality control based on IIoT according to some embodiments of the present disclosure.
Figure 3:
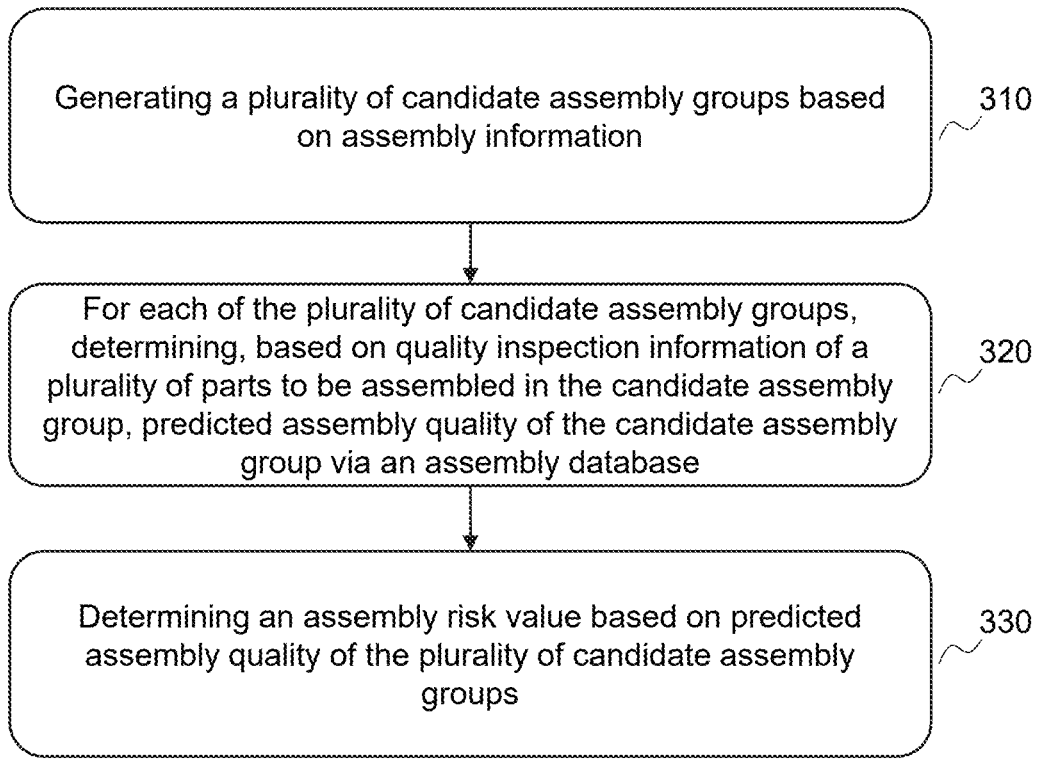
FIG. 3 is a flowchart of an exemplary process for determining an assembly risk value according to some embodiments of the present disclosure.
Figure 4:
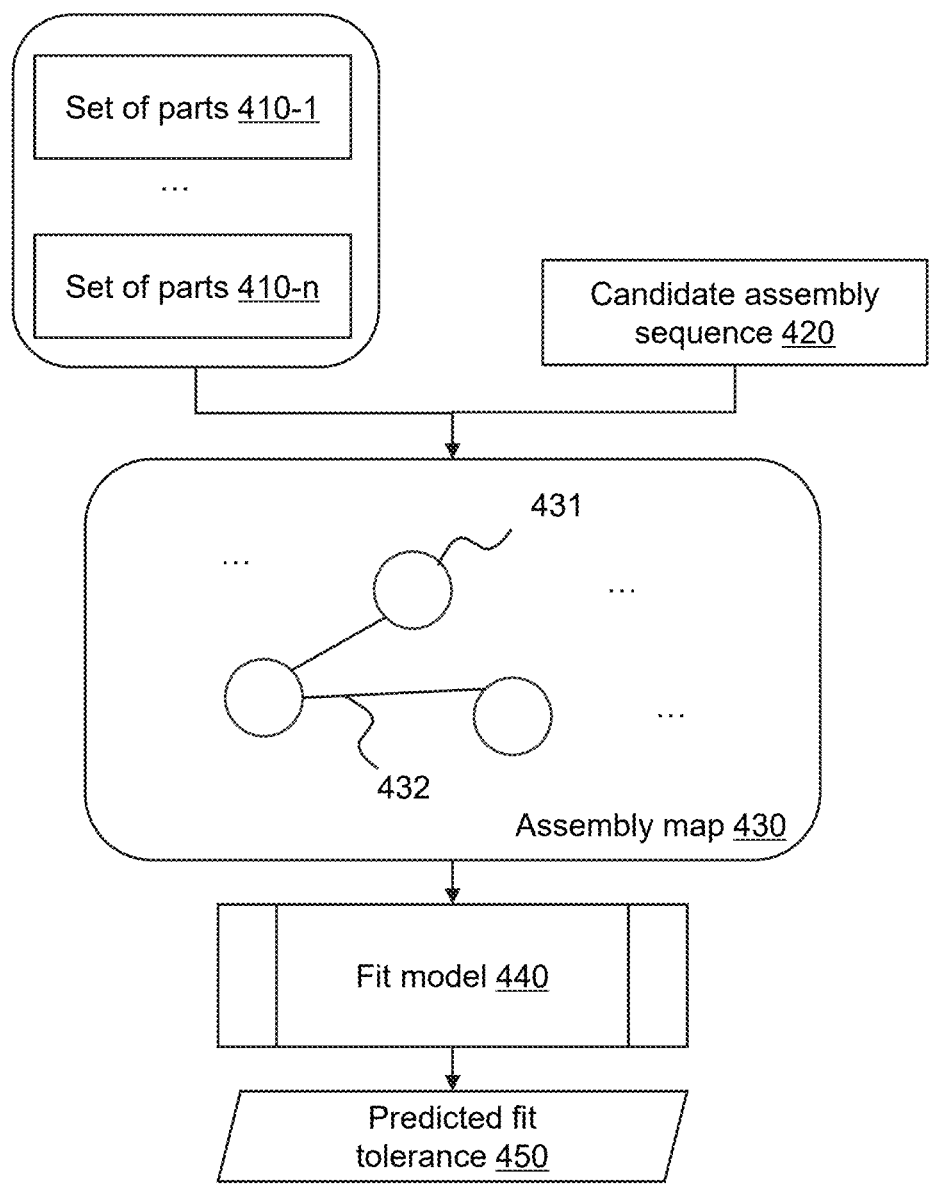
FIG. 4 is a schematic diagram of an exemplary fit model according to some embodiments of the present disclosure.

More detailed descriptions of the foregoing may be found in the descriptions of FIG. 2 to FIG. 4.

In some embodiments of the present disclosure, based on the IIoT system 100, a closed loop of information operation can be formed between various functional platforms for coordinated and regulated operations, thereby realizing intelligent and information-based assembly quality control.

FIG. 2 is a flowchart of an exemplary process of a method for assembly quality control based on IIoT according to some embodiments of the present disclosure. In some embodiments, process 200 is performed by an IIoT management platform (hereinafter referred to as the management platform) of the IIoT system 100. As shown in FIG. 2, process 200 includes the following operations:

In 210, obtaining, based on an IIoT sensing network platform, quality inspection information of a plurality of parts to be assembled through a quality inspection device of an IIoT sensing and control platform.

The quality inspection information refers to data related to the quality inspection of the parts to be assembled.

In some embodiments, the quality inspection information includes machining accuracy, surface roughness, or the like. The machining accuracy refers to a difference between an actual dimension and a design dimension of the parts to be assembled. The design dimension refer to a theoretical size of the parts to be assembled.

The surface roughness characterizes a degree of surface roughness of the parts to be assembled, and is expressed through a numerical value or the like. The larger the value is, the higher the surface roughness is. More descriptions on the acquisition of the design dimension may be found in operation 220 and its related description.

In some embodiments, the management platform obtains the quality inspection information based on the IIoT sensing network platform via the quality inspection device of the IIoT sensing and control platform.

The quality inspection information is obtained by measuring the parts to be assembled by the quality inspection device of the IIoT sensing and control platform. For example, the actual dimensions of the parts to be assembled are measured by a coordinate measuring machine, and the machining accuracy is obtained by determining the difference between the actual dimensions and the designed dimensions. For example, the surface roughness of the parts to be assembled is measured by a motorized profilometer.

More descriptions of the quality inspection device and the parts to be assembled may be found in FIG. 1 and the related descriptions thereof.

In 220, determining, based on the quality inspection information and assembly information, an assembly risk value of each of at least one assembly process through an assembly database.

The assembly information refers to information related to assembly of the parts to be assembled. In some embodiments, the assembly information includes at least one assembly process and an assembly object, a position to be assembled, an interference relationship, an assembly position, and a connection relationship corresponding to each of the at least one assembly process. The assembly object refers to two or more parts to be assembled that need to be assembled. The position to be assembled refers to a position to which the parts to be assembled need to be assembled. The assembly position refers to a position on the parts to be assembled used for assembly. Exemplarily, the position to be assembled is a recess, and the assembly position is a protrusion on the parts to be assembled.

The assembly process refers to a process in which the parts to be assembled are assembled to obtain a finished product.

The interference relationship refers to a relationship that results from an order an assembly sequence between assembly objects. For example, insufficient machining accuracy of the parts to be assembled in an earlier assembly sequence may result in the parts to be assembled in a later sequence being unable to be assembled.

The connection relationship refers to a manner of connection between the assembly objects. For example, the connection relationship includes at least one of a threaded connection, a pinned connection, or the like.

In some embodiments, the management platform obtains the assembly information or an assembly drawing from an IIoT user platform via an IIoT service platform. The assembly drawing refers to a design drawing that include data related to an assembly operation.

The assembly information or the assembly drawing of the IIoT user platform may be obtained by user input or the like. The management platform extracts the assembly information and/or the design dimension from the assembly drawings by image extraction, or the like.

The assembly risk value refers to data that characterizes a likelihood of risks occurring in the assembly process of the parts to be assembled. The risks that may occur include, but are not limited to, substandard assembly quality, or the like.

Understandably, assembling a finished product requires at least one assembly process, and the assembly risk value of each of the at least one assembly process needs to be determined.

In some embodiments, the management platform determines the assembly risk value of each of the at least one assembly process based on the quality inspection information and the assembly information via the assembly database. For example, for the assembly object corresponding to each assembly process in the assembly information, the management platform counts a retrieval range of the quality inspection information of the assembly object. Based on the retrieval range, the management platform retrieves, from the assembly database, historical assembly records in which historical quality inspection information is within the retrieval range. The management platform determines a ratio of a count of the historical assembly records whose historical assembly quality is nonconforming to a total count of retrieved historical assembly records, and designates the ratio as the assembly risk value of the assembly process.

In some embodiments, the management platform counts a maximum value and a minimum value in the quality inspection information of the assembly object, designating the maximum value as an upper limit of the retrieval range and the minimum value as a lower limit of the retrieval range. The value of the quality inspection information is represented by a sum of the value of the machining accuracy and the value of the surface roughness.

The assembly database refers to a database that stores historical assembly records. In some embodiments, the assembly database includes a plurality of historical assembly records. A historical assembly record refers to data related to a single assembly operation within a historical time period for a single assembly process. The historical assembly record includes historical quality inspection information, historical assembly information, historical assembly quality, and historical assembly process data for the parts to be assembled in a single assembly operation of an assembly process. The historical assembly quality refers to the assembly quality after a single assembly operation in an assembly process and/or the overall assembly quality of an entire assembly task. See operations 250 and 260 and their associated descriptions for more descriptions of the assembly process data and the assembly quality.

In some embodiments, the management platform stores the quality inspection information, the assembly information, the assembly quality, and the assembly process data of the parts to be assembled used for one assembly operation in each assembly process as a historical assembly record in the assembly database. The assembly database is obtained by storing multiple historical assembly records.

In some embodiments, the assembly database is configured in a data center of the management platform. See FIG. 1 and its related descriptions for more descriptions of the data center.

In some embodiments, the management platform determines the assembly risk value based on a plurality of predicted assembly qualities of a plurality of candidate assembly groups. More descriptions may be found in FIG. 3 and its related descriptions thereof.

In 230, generating a first assembly parameter in response to the assembly risk value satisfying a risk condition.

The risk condition is a condition for determining whether or not to generate the first assembly parameter.

In some embodiments, the risk condition includes the assembly risk value exceeding a risk threshold. One assembly process corresponds to one risk threshold. In response to the assembly risk value of an assembly process exceeding the corresponding risk threshold, the management platform generates the first assembly parameter for the assembly process. In response to the assembly risk value of the assembly process not exceeding the corresponding risk threshold, an original first assembly parameter for the assembly process is maintained. The original first assembly parameter refers to an assembly parameter that were used for the assembly process historically.

In some embodiments, the risk threshold is pre-set based on an acceptable failure rate defined by a user, e.g., the lower the failure rate that the user may accept, the lower the risk threshold. The acceptable failure rate is pre-set by the user based on production needs.

The first assembly parameter refers to a parameter for guiding the assembly operation. In some embodiments, the first assembly parameter includes an assembly grouping parameter. The assembly grouping parameter refers to grouping of the parts to be assembled for the assembly operation.

See operation 240 and the related descriptions thereof for more descriptions of the assembly operation.

In some embodiments, the management platform determines the first assembly parameter in multiple ways. For example, for a single assembly process, the management platform grades assembly objects based on the quality inspection information of the parts to be assembled in the assembly objects, classifies the assembly objects of a same grade into a group and to obtain a plurality of groups. The group classification of the parts to be assembled in the assembly object is designated as the assembly grouping parameter corresponding to the assembly process.

Taking the assembly object including two types of parts to be assembled as an example, the management platform classifies each type of parts to be assembled into three levels based on the machining accuracy of the parts to be assembled (e.g., the machining accuracy of 1.5 mm-2 mm is classified as Level 3, the machining accuracy of 1 mm-1.5 mm is classified as Level 2, and the machining accuracy of 0.5 mm-1.5 mm is classified as Level 1). Parts to be assembled of the same level from the two types are classified into one group, resulting in a plurality of groups of parts to be assembled. These groups and the serial numbers of the parts within each group are designated as the assembly grouping parameters. The serial numbers are automatically generated by the management platform based on the production sequence of the parts to be assembled.

In some embodiments, a count of the levels classified by the management platform correlates to the assembly risk value. The higher the assembly risk value is, the more levels are classified.

The management platform determines the assembly grouping parameter corresponding to each assembly process through the manner described above.

In some embodiments, the management platform determines a fit part based on the historical assembly records of a plurality of parts to be assembled, and generates the first assembly parameter based on the fit part.

More descriptions of the historical assembly record may be found in operation 220 and the related descriptions thereof.

The fit part refers to a part to be assembled that needs to be assembled with another part to be assembled in the assembly operation. The difference between the fit part and the assembly object is that the assembly object corresponds to a single assembly process, and the fit part corresponds to the entire assembly operation.

In some embodiments, the management platform determines the fit part based on the historical assembly records of the plurality of parts to be assembled. For example, for two or more parts to be assembled that need to be assembled with each other in the assembly operation, the management platform determines the part to be assembled with a highest assembly degree as a center part. Based on the center part, the management platform counts a reference fit tolerance range of each type of parts to be assembled with the center part based on the historical assembly record, and selects at least one part to be assembled from each type of the parts to be assembled whose fit tolerance with the center part is within the range of reference fit tolerance. The management platform then randomly selects one from the selected at least one part to be assembled as the fit part of the center part. For example, if the center part is assembled with m-type parts and n-type parts, then one part to be assembled is selected from each of the m-type parts and n-type parts as the fit part of the center part.

The assembly degree refers to a count of types of parts to be assembled that are assembled with a single part to be assembled. For example, if an m-type part is assembled with an s-type part in assembly process 1, and an n-type part is inter-assembled with the s-type part in assembly process 2, then the assembly degree of the s-type part is 2.

The fit tolerance refers to a difference in dimension between the position to be assembled of one part to be assembled and the assembly position of another part to be assembled. For example, if the position to be assembled of a part to be assembled is 50 mm, and the assembly position of another part to be assembled is 49.5 mm, then the fit tolerance between the two parts to be assembled is 0.5 mm. The fit tolerance may be expressed as a numerical value with a plus or minus sign, wherein the sign is used to indicate a relative size relationship between the position to be assembled and the assembly position.

The reference fit tolerance range refers to a range of fit tolerances for reference. In some embodiments, for each type of parts to be assembled, the management platform counts, based on the historical assembly records, historical fit tolerances between the type of parts to be assembled and the center part in the historical assembly records where the assembly quality is qualified. The management platform sets a maximum value of the historical fit tolerances as an upper limit of the reference fit tolerance range and a minimum value of the historical fit tolerance as a lower limit of the reference fit tolerance range.

The management platform may determine fit parts for a plurality of center parts through the above manner.

In some embodiments, the management platform groups the center part and a plurality of fit parts corresponding to multiple assembly processes into a group, and obtains a plurality of groups through multiple groupings. The groupings of the parts to be assembled are designated as the assembly grouping parameter, thereby obtaining the assembly parameters.

According to some embodiments of the present disclosure, parts with comparable tolerances are classified as a group for assembly, which is conducive to identifying combinations of parts to be assembled suitable for assembly with each other among a large number of parts to be assembled, thus improving the overall assembly quality.

In some embodiments, the first assembly parameter includes an assembly sequence parameter. The management platform generates a plurality of candidate assembly sequences based on the assembly information, and determines the first assembly parameter based on a predicted fit tolerance corresponding to each candidate assembly sequence. More descriptions may be found in FIG. 4 and its related descriptions.

In 240, sending the first assembly parameter to an operation device of the IIoT sensing and control platform, and controlling the operation device to perform an assembly operation on the plurality of parts to be assembled based on the first assembly parameter.

The assembly operation refers to a process in which the operation device assembles the parts to be assembled into a finished product. In some embodiments, the management platform sends, via the IIoT sensing network platform, the first assembly parameter to the operation device of the IIoT sensing and control platform, and the operation device performs the assembly operation based on the first assembly parameter. The management platform may assign a number to each assembly operation to distinguish multiple assembly operations.

More descriptions of the operation device may be found in FIG. 1 and the related descriptions thereof.

In 250, obtaining assembly process data of the assembly operation based on a monitoring device of the IIoT sensing and control platform.

The assembly process data refers to data related to the process of the assembly operation. In some embodiments, the assembly process data includes at least one of environmental data, part information, process data, result data, or the like.

The environmental data includes a temperature and a humidity of an environment in which the assembly operation takes place. The part information includes the model number, quality inspection information, etc., of the parts to be assembled. The process data includes a torque applied by the operation device, a relative displacement between the parts to be assembled, or the like. The result data includes dimensional data, etc., of the finished or semi-finished product after assembly.

In some embodiments, the management platform obtains the assembly process data of the assembly operation through the IIoT sensing network platform based on the monitoring device of the IIoT sensing and control platform. More descriptions of the monitoring device may be found in FIG. 1 and its related description.

In 260, determining an assembly quality of a completed process based on the assembly process data.

The completed process refers to an assembly process in which the assembly has been completed. In some embodiments, when the monitoring device monitors that the assembly process has been completed, the monitoring device sends the information that the assembly process has been completed to the IIoT sensing and control platform.

The IIoT sensing and control platform sends the information that the assembly process has been completed to the management platform via the IIoT sensing network platform. The management platform determines the completed process based on the information that the assembly process has been completed.

The assembly quality refers to data that characterizes the quality of assembly. In some embodiments, the assembly quality may be expressed by "qualified" and "nonconforming", or expressed by a numerical value, or the like. For example, a numerical value of 1 indicates qualified quality and a numerical value of 0 indicates nonconforming quality.

In some embodiments, the management platform determines the assembly quality of the completed process in multiple ways based on the assembly process data. For example, based on the environmental data and the part information, the management platform queries a quality table to determine a reference process data interval and a reference dimensional interval corresponding to the environmental data and the part information, respectively. The management platform determines the assembly quality of the completed process based on a relative relationship between the process data and the reference process data interval and a relative relationship between the dimensional data and the reference dimensional interval.

In some embodiments, the quality table is pre-set by a technician based on historical assembly records. The quality table includes a plurality of sets of environmental data and part information as well as the reference process data interval and the reference dimensional interval corresponding to each set. For example, the technician filters a plurality of historical assembly records under the plurality of sets of environmental data and part information where the assembly quality is qualified. For the plurality of historical assembly records under each set of environmental data and part information, a process data interval and a dimensional data interval are determined from the plurality of historical assembly records, and the process data interval and the dimensional data interval are designated as the reference process data interval and the reference dimensional interval corresponding to the set of environmental data and part information.

The relative relationship characterizes a relative size of the process data with respect to the reference process data interval and/or a relative size of the dimensional data with respect to the reference dimensional interval. In some embodiments, the relative relationship includes the process data being within the reference process data interval, or the process data being less than a lower limit of the reference process data interval, or the process data being greater than an upper limit of the reference process data interval.

In some embodiments, the relative relationship further includes the dimensional data being within the reference dimensional interval, the dimensional data being less than a lower limit of the reference dimensional interval, and the dimensional data being greater than an upper limit of the reference dimensional interval.

In some embodiments, if the relative relationship is that the process data is within the reference process data interval and the dimensional data is within the reference dimensional interval, the management platform determines that the assembly quality of the completed process is qualified, and if the relative relationship is that the process data is not within the reference process data interval and the dimensional data is not within the reference dimensional interval (e.g., less than the lower limit or greater than the upper limit), the management platform determines that the assembly quality of the completed process is nonconforming.

In 270, in response to determining that the assembly quality does not satisfy a quality requirement, determining a second assembly parameter based on the assembly quality, sending the second assembly parameter to a subsequent operation device of the IIoT sensing and control platform, and controlling the subsequent operation device to perform the assembly operation based on the second assembly parameter.

In some embodiments, in response to determining that the assembly quality satisfy the quality requirement, the subsequent operation device continues the assembly operation based on the first assembly parameter determined in operation 230.

The quality requirement refers to an overall quality requirement for the assembly operation. In some embodiments, the quality requirement includes a ratio of a count of completed processes whose assembly quality is "nonconforming" to a total count of assembly processes being less than a predetermined value. The predetermined value includes an acceptable nonconforming rate predefined by the user, or the like.

The second assembly parameter refers to the assembly parameter of the subsequent operation device. The subsequent operation device refers to the operation device corresponding to the assembly process that has been completed, but has not yet begun the next assembly process.

In some embodiments, the management platform determines the second assembly parameter based on the assembly quality. For example, the management platform rejects, via the IIoT sensing and control platform, semi-finished products from the completed processes whose assembly quality is "nonconforming", and determines the second assembly parameter based on the dimensional data of the remaining semi-finished products (similar to the machining accuracy and surface roughness in the quality inspection information) in the same manner as the generation of the first assembly parameter in operation 230. The IIoT sensing and control platform includes a robotic arm, or the like for sorting finished or semi-finished products.

In some embodiments, the management platform sends the second assembly parameter via the IIoT sensing network platform to the subsequent operation device of the IIoT sensing and control platform to update the first assembly parameter of the subsequent operation device.

In 280, generating quality warning information based on the assembly quality and the second assembly parameter, and sending the quality warning information to an IIoT user platform based on an IIoT service platform.

The quality warning information is information used to alert the user that the assembly quality of the assembly process is nonconforming. In some embodiments, the quality warning information includes at least one of a warned process, the rejected semi-finished product, and the second assembly parameter. The warned process refers to a completed process in which the assembly quality is nonconforming.

In some embodiments, the management platform generates the quality warning information based on the assembly quality and the second assembly parameter in multiple ways. For example, based on the assembly quality and the second assembly parameter, the management platform takes a completed process with an nonconforming assembly quality as the warned process, takes the serial number of the warned process, the serial number of the rejected semi-finished product, and the second assembly parameter as the quality warning information, and sends the quality warning information to the IIoT user platform based on the IIoT service platform. The serial number of the rejected semi-finished product is the same as the serial number of the assembly operation corresponding to the semi-finished product.

In some embodiments, the user obtains the quality warning information via the IIoT user platform and determines the second assembly parameter. The user determines the second assembly parameter based on technical experience and sends determination information for indicating the determined second assembly parameter to the management platform via the IIoT user platform via the IIoT service platform.

In 290, generating, based on the completed process, quality update data for updating the assembly database.

The quality update data refers to a historical assembly record of the completed process. In some embodiments, the management platform generates the quality update data based on the completed process. For example, the management platform constructs a historical assembly record based on the assembly process data of the completed process, the quality inspection information of the parts to be assembled, the assembly information, and the assembly quality, and stores the historical assembly record as the quality update data in the assembly database.

In some embodiments, the management platform may perform data merge consolidation on the assembly database to merge the same or similar historical assembly records, avoiding insufficient space in the assembly database due to continuous storage of the quality update data.

More descriptions of the various platforms of the IIoT system for assembly quality control may be found in the corresponding descriptions in FIG. 1.

In some embodiments of the present disclosure, the method for assembly quality control based on IIoT, which can predict the possibility of nonconforming assembly quality, which allows for the determination of the first assembly parameter that results in higher assembly quality. In addition, the method enables timely warnings or adjustments to the first assembly parameter based on the nonconforming assembly quality, realizing efficient and safe production of products.

FIG. 3 is a flowchart of an exemplary process for determining an assembly risk value according to some embodiments of the present disclosure.

In 310, generating a plurality of candidate assembly groups based on assembly information.

More descriptions of the assembly information may be found in FIG. 2 and its related descriptions.

A candidate assembly group is a combination of multiple parts to be assembled, which are to be determined for obtaining a finished product.

In some embodiments, the management platform generates the plurality of candidate assembly groups based on the assembly information in a variety of ways. For example, based on preset types and types of parts to be assembled in the assembly information, the management platform randomly selects, for each of the preset types, a preset count of parts from the parts of the same type within the preset type. The selected parts of various types are then arranged and combined to form a candidate assembly group. The management platform generates the plurality of candidate assembly groups following the same manner. Each type of parts to be assembled may be pre-stored in a data center of the management platform.

The preset type refers to at least one type of parts required to assemble to obtain the finished product. The preset count refers to the count of parts of different types needed to assemble the finished product.

In some embodiments, the management platform obtains the preset types and the preset count from the IIoT user platform via the IIoT service platform. The preset types include a plurality of types. The preset count includes a plurality of pieces of data, each of which corresponds to a desired count of a type of parts to be assembled. In some embodiments, the user pre-sets the preset types and the preset count via the IIoT user platform.

In some embodiments, the management platform determines, based on the type of the plurality of parts to be assembled, a set of parts; determines, based on quality inspection information of the plurality of parts to be assembled in the set of parts, a plurality of sub-sets of parts; and determines, based on the plurality of sub-sets of parts, the plurality of candidate assembly groups.

The set of parts refers to a set of parts sub-set that are of the same type.

In some embodiments, the management platform determines the set of parts based on the type of the plurality of parts to be assembled. For example, the management platform designates a plurality of parts to be assembled that are of the same type as the set of parts.

The sub-sets of parts is a sub-set obtained by dividing the set of parts. In some embodiments, different sets of parts are divided to obtain different counts of sub-sets.

In some embodiments, the management platform determines a plurality of sub-sets of parts based on the quality inspection information of a plurality of parts to be assembled in the set of parts. For example, the management platform determines the sub-set of parts based on the quality inspection information of the plurality of parts to be assembled in the set of parts by clustering the plurality of parts to be assembled in the set of parts using a clustering algorithm. The clustering algorithm includes a K-means clustering algorithm, etc.

Exemplarily, the management platform randomly selects k parts to be assembled from the set of parts as initial clustering centers, and constructs a plurality of quality inspection feature vectors based on the quality inspection information of the parts to be assembled, with each quality inspection feature vector corresponding to a part to be assembled. The management platform determines a vector distance between each part to be assembled and the initial clustering centers based on the plurality of quality inspection feature vectors, and assigns the parts to be assembled to a cluster where the initial clustering center with a closest vector distance is located. The management platform determines a vector mean value of the plurality of quality inspection feature vectors in the cluster where each initial clustering center is located, and designates the vector mean as a new clustering center. The vector distance between each part to be assembled and the new clustering center is determined, and the parts to be assembled are assigned to a cluster where the new clustering center with a closest vector distance is located. The management platform repeats the above operations until the clustering center no longer changes, obtaining k clusters, each of which is designated as a sub-set of parts.

The k is the count of the sub-sets of parts. In some embodiments, the count of the plurality of sub-sets of parts is related to the quality inspection information of the plurality of parts to be assembled in the set of parts. The management platform determines the value of k based on the quality inspection information of the plurality of parts to be assembled in the set of parts. For example, the management platform determines the value of k by a variance of the quality inspection information of the plurality of parts to be assembled in the set of parts, where a larger variance indicates that the quality inspection information is more dispersed, and the larger the value of k is.

In some embodiments, the count of the plurality of sub-sets of parts is also related to a fit part corresponding to the parts to be assembled in the sub-sets of parts and a reference fit tolerance range of the fit part. For example, based on the count of sub-sets of parts determined above, the narrower the reference fit tolerance range of the fit part is, the greater an increase in the count of corresponding sub-sets of parts adjusted by the management platform. Conversely, the wider the reference fit tolerance range of the fit part is, the greater an decrease in the count of corresponding sub-sets of parts adjusted by the management platform. More description of the fit part and the reference fit tolerance range may be found in operation 230 and the related descriptions thereof.

If there are a plurality of fit parts corresponding to the parts to be assembled in the sub-sets of parts, the management platform counts a maximum upper limit and a minimum lower limit of the reference fit tolerance ranges of the plurality of fit parts, takes the maximum upper limit and the minimum lower limit as a new reference fit tolerance range, and adjusts the count of corresponding sub-sets of parts based on the new reference fit tolerance ranges.

In some embodiments of the present disclosure, the narrower the reference fit tolerance range of the fit part, the higher the requirements for the assembly, the more detailed division of the set of parts is required, and the larger the count of plurality of sub-sets of parts, which in turn facilitates the subsequent determination of the candidate assembly groups that meet actual requirements, ensuring the accuracy of the subsequent predicted assembly quality.

In some embodiments, the management platform generates the candidate assembly groups based on the sub-sets of parts. For example, the management platform, based on the type of parts to be assembled from the preset types and assembly information, randomly selects a preset count of parts to be assembled from a plurality of sub-sets of parts of the same type for each type in the preset types. These various types of parts are then combined to form a candidate assembly group. The management platform may generate a plurality of candidate assembly groups in the same manner.

In some embodiments of the present disclosure, a plurality of sub-sets of parts are obtained by clustering parts of the same type based on the quality inspection information, and a plurality of candidate assembly groups are obtained by arranging and combining a plurality of sub-sets of parts of different types, which can reduce data volume and improve the efficiency of determining the candidate assembly groups.

In 320, for each of the plurality of candidate assembly groups, determining, based on the quality inspection information of a plurality of parts to be assembled in the candidate assembly group, a predicted assembly quality of the candidate assembly group via the assembly database.

More descriptions of the quality inspection information, the assembly database, and the assembly quality may be found in FIG. 2 and the related descriptions thereof.

The predicted assembly quality refers to predicted assembly quality of the finished product obtained by assembly based on the candidate assembly group.

In some embodiments, for each of the plurality of candidate assembly groups, the management platform determines, based on the quality inspection information of the plurality of parts to be assembled in the candidate assembly group, the predicted assembly quality of the candidate assembly group via the assembly database. For example, for each candidate assembly group, the management platform constructs an accuracy vector based on the machining accuracy of the plurality of parts to be assembled in the candidate assembly group, retrieves, from the assembly database, a complete assembly record that satisfies a first retrieval condition based on the accuracy vector, and designates the assembly quality of the retrieved complete assembly record as the predicted assembly quality.

The complete assembly record refers to a combined record of historical assembly records corresponding to multiple historical assembly processes in a single historical assembly operation. The assembly quality of the complete assembly record refers to the assembly quality of the finished product in the complete assembly record, including "qualified" and "nonconforming". See FIG. 2 and its related descriptions for more descriptions of the historical assembly records.

In some embodiments, the management platform constructs a reference accuracy vector based on a plurality of historical machining accuracies in the complete assembly record. The first retrieval condition is pre-set based on historical experience. For example, the first retrieval condition is the complete assembly record corresponding to a reference accuracy vector with a highest similarity to the accuracy vector.

In some embodiments, the management platform determines a plurality of reference assembly records through the assembly database based on the quality inspection information of a plurality of parts to be assembled in each candidate assembly group, and based on the plurality of reference assembly records, determines the predicted assembly quality for each candidate assembly group based on the plurality of reference assembly records.

A reference assembly record is the complete assembly record corresponding to the candidate assembly group that satisfies a second retrieval condition.

The following takes one candidate assembly group as an example for illustration.

In some embodiments of the present disclosure, the management platform constructs an accuracy vector based on the machining accuracy of a plurality of parts to be assembled in the candidate assembly group, retrieves a plurality of complete assembly records satisfying a second retrieval condition in the assembly database based on the accuracy vector, and designates the plurality of complete assembly records as the plurality of reference assembly records. The second retrieval condition is pre-set based on historical experience. For example, the second retrieval condition is a complete assembly record corresponding to a reference accuracy vector that has a similarity to the accuracy vector that is greater than a preset similarity threshold.

In some embodiments of the present disclosure, the management platform determines the preset similarity threshold based on the quality inspection information of the plurality of parts to be assembled of each type in the candidate assembly group. For example, based on the quality inspection information of the plurality of parts to be assembled of each type in the candidate assembly group, the management platform determines a range of the quality inspection information of each type of parts to be assembled, and determines a mean, a median, or the like of each range to determine the a preset similarity threshold based on the mean or median. The larger the mean or median value is, the smaller the preset similarity threshold is.

In some embodiments of the present disclosure, based on a plurality of reference assembly records corresponding to the candidate assembly group, the management platform counts the assembly quality of each of the plurality of reference assembly records. If a ratio of a count of reference assembly records where the assembly quality is "qualified" to a total count of reference assembly records is greater than a predetermined evaluation value, then the predicted assembly quality of the candidate assembly group is qualified. If the ratio of the count of reference assembly records where the assembly quality is "qualified" to the total count of reference assembly records is not greater than the predetermined evaluation value, then the predicted assembly quality of the candidate assembly group is "nonconforming". The preset evaluation value is pre-set based on historical experience.

In some embodiments of the present disclosure, determining the predicted assembly quality based on a plurality of reference assembly records takes into account a dispersion degree of the quality inspection information of the parts to be assembled, which in turn allows for a more comprehensive prediction of the assembly quality of the candidate assembly group.

In some embodiments of the present disclosure, for each of the plurality of reference assembly records, the management platform obtains a machining accuracy of a plurality of historical assembly parts in the reference assembly record; determines a matching degree between the reference assembly record and a candidate assembly group corresponding to the reference assembly record based on the machining accuracies and an impact value of the plurality of historical assembly parts on the assembly quality of a finished product. Based on the matching degree and historical assembly quality in the plurality of reference assembly records, the management platform determines the predicted assembly quality for the candidate assembly group.

The following takes one reference assembly record as an example for illustration.

The impact value refers to data that characterizes a degree of influence of a plurality of historical assembly parts in the reference assembly record on the assembly quality of a finished product. The larger the impact value is, the greater the influence of the historical assembly parts on the assembly quality of the finished product. The assembly quality of the finished product includes qualified and nonconforming.

In some embodiments of the present disclosure, for each reference assembly record, the management platform determines a ratio between the machining accuracy of the plurality of historical assembly parts in the reference assembly record and a design dimension as a first ratio. The machining accuracy of the plurality of historical assembly parts may be represented by an average or a median value of the historical machining accuracies of the plurality of historical assembly parts. See FIG. 2 and its related descriptions for more descriptions of the design dimension.

In some embodiments of the present disclosure, the management platform determines an average value of dimensional data of a historical finished product corresponding to the machining accuracy of a plurality of historical assembly parts in the historical assembly record, determines a difference between the average value of the dimensional data and a median value of a reference dimensional interval, and designates a ratio of the difference to the median value of the reference dimensional interval as a second ratio. The reference dimensional interval corresponds to the reference assembly record and is determined by a technician through the manner of determining the reference dimensional interval in described in operation 260.

In some embodiments of the present disclosure, the management platform uses a ratio of the first ratio to the second ratio as the impact value of the plurality of historical assembly parts in the reference assembly record on the assembly quality of the finished product.

The matching degree refers to data that characterizes a degree of matching between the reference assembly record and the candidate assembly group.

In some embodiments of the present disclosure, the management platform determines the matching degree between the reference assembly record and corresponding candidate assembly group based on the machining accuracy and the impact value of the plurality of historical assembly parts on the assembly quality of the finished product in multiple ways. For example, the management platform determines a ratio of the impact value to the machining accuracy as the matching degree between the reference assembly record and the corresponding candidate assembly group. As another example, the management platform determines the matching degree between the reference assembly record and the corresponding candidate assembly group based on a correspondence between the impact value, the machining accuracy, and the matching degree. The correspondence includes that the lower the machining accuracy, the higher the impact value, and the higher the matching degree.

In some embodiments, the management platform determines the predicted assembly quality of the candidate assembly group based on the matching degree between each reference assembly record and the corresponding candidate assembly group, as well as historical assembly quality in the plurality of reference assembly records. For example, the management platform selects, from the plurality of reference assembly records, a reference assembly record that has a highest matching degree, and designates the historical assembly quality in the reference assembly record as the predicted assembly quality of the candidate assembly group.

In some embodiments of the present disclosure, determining the predicted assembly quality by the matching degree is able to take into account the degree of matching between the reference assembly record and the candidate assembly group, which is closer to the actual assembly situation, and obtain a more accurate predicted assembly quality.

In 330, determining the assembly risk value based on predicted assembly quality of the plurality of candidate assembly groups.

In some embodiments, the management platform may determine the assembly risk value based on the predicted assembly quality. For example, the management platform determines a ratio of a count of candidate assembly groups whose predicted assembly quality is nonconforming to a total count of candidate assembly groups as the assembly risk value. The assembly risk value corresponds to the entire assembly operation, and accordingly, a risk threshold corresponding to the assembly risk value determined in this manner is set separately.

In some embodiments of the present disclosure, by determining the predicted assembly quality through the quality inspection information of the plurality of parts to be assembled in the plurality of candidate assembly groups, the assembly quality of each candidate assembly group can be predicted and, based on the predicted assembly quality of each candidate assembly group, the assembly risk value can be determined. This approach results in an assembly risk value with wider applicability and greater possibility, enabling an accurate assessment of whether the assembly risk value meets risk conditions.

It should be noted that the foregoing descriptions of the process 200 and process 300 are for the purpose of exemplification and illustration only and do not limit the scope of application of the present disclosure. For a person skilled in the art, various modifications and changes may be made to the processes under the guidance of the present disclosure. However, these modifications and changes remain within the scope of the present disclosure.

FIG. 4 is a schematic diagram of an exemplary fit model according to some embodiments of the present disclosure.

In some embodiments, a first assembly parameter includes an assembly sequence parameter. A management platform generates a plurality of candidate assembly sequences based on assembly information. For each of the plurality of candidate assembly sequences 420, the management platform constructs an assembly map 430 corresponding to the candidate assembly sequence 420 based on a plurality of sets of parts (e.g., set of parts 410-1, . . . , set of parts 410-n), a plurality of sub-sets of parts (e.g., a plurality of sub-sets of parts corresponding to set of parts 410-1, . . . , a plurality of sub-sets of parts corresponding to set of parts 410-n), and the candidate assembly sequence 420. The management platform determines a predicted fit tolerance 450 corresponding to each of the candidate assembly sequences 420 via a fit model 440, and determines the assembly sequence parameter based on a plurality of predicted fit tolerances corresponding to the plurality of candidate assembly sequences 420.

See FIGS. 1-3 and their related descriptions for descriptions of the management platform, assembly information, the first assembly parameter, the set of parts, and the sub-sets of parts.

The candidate assembly sequence refers to relevant data to be determined as the assembly sequence parameter. The assembly sequence parameter refers to data related to the assembly sequence of parts to be assembled.

In some embodiments, the management platform generates the plurality of candidate assembly sequences in multiple ways based on the assembly information. For example, the management platform randomly sorts a plurality of parts to be assembled multiple times to obtain the plurality of candidate assembly sequences and, based on an interference relationship in the assembly information, filters the plurality of candidate assembly sequences to eliminate candidate assembly sequences that have conflicting interference relationships.

A candidate assembly sequence having a conflicting interference relationship is a candidate assembly sequence that cannot be realized due to an interference relationship between parts to be assembled. Exemplarily, an interference relationship between part A and part B includes that if part A is assembled before part B, part B is prevented from being assembled, then any candidate assembly sequence in which part A is assembled before B is a candidate assembly sequence that has a conflicting interference relationship.

The assembly map 430 refers to a graph structure that characterizes a connection relationship between the plurality of sets of parts (or parts to be assembled). The graph structure is a data structure consisting of nodes (e.g., nodes 431) and edges (e.g., edges 432), where the edges connect the nodes, and the nodes and edges may have features. See FIG. 2 and its related descriptions for more descriptions of the connection relationship.

In some embodiments, the management platform may construct an assembly map corresponding to each candidate assembly sequence based on the plurality of sub-sets of parts and each of the plurality of candidate assembly sequences.

The nodes of the assembly map include different types of sets of parts (or parts to be assembled). Node features include relevant data of the sub-sets of parts corresponding to the set of parts, an assembly degree of the parts to be assembled in the set of parts, etc. The relevant data includes a count of the sub-sets of parts, a maximum value and a minimum value of quality inspection information in each sub-sets of parts, etc. The relevant data is obtained by the management platform by counting the sub-sets of parts.

See FIG. 2 and its related descriptions for more descriptions of the assembly degree.

An edge connects sets of parts in the assembly map that have a connection relationship. Edge features include the ordering of the sets of parts at two ends of the edge in the candidate assembly sequence.

It is understood that the parts in the set of parts are of the same type of parts to be assembled, therefore one set of parts may be used to represent one type of parts to be assembled in the assembly map.

Edge features of assembly maps corresponding to different candidate assembly sequences may be different.

The predicted fit tolerance refers to a predicted fit tolerance of two parts to be assembled in the candidate assembly sequence. In some embodiments, the predicted fit tolerance includes a plurality of pieces of data, each corresponding to an edge in the assembly map. For a more detailed description of the fit tolerance, see FIG. 2 and the related descriptions thereof.

The fit model is a model configured to determine the predicted fit tolerance. The fit model may be a machine learning model. For example, the fit model may include any one of a Graph Neural Network (GNN) model, other customized model structures, or a combination thereof.

In some embodiments, an edge output of the fit model includes a representation of the predicted fit tolerance between the two nodes connected by the edge.

In some embodiments, the management platform may train the fit model based on a large count of labeled training samples through a gradient descent technique, or the like. The training samples include a sample assembly map, and the labels include actual fit tolerances corresponding to the sample assembly map.

In some embodiments of the present disclosure, the training samples and the labels are obtained based on a complete assembly record. For example, the management platform builds the sample assembly map based on a historical set of parts and a historical assembly sequence in the complete assembly record. Nodes and node features, as well as edges and edge features of the sample assembly map are similar to the nodes, node features, edges, edge features of the assembly map described above. See FIG. 3 and the related descriptions thereof for a description of the complete assembly record.

As another example, the management platform filters a plurality of complete assembly records with a same historical assembly sequence from complete assembly records, and determines a count of reworked products and a count of qualified products per unit of time under the corresponding historical fit tolerance for each of the plurality of complete assembly records. The management platform selects complete assembly records in which a difference between the count of qualified products and the count of reworked products exceeds a required qualified count, selects two types of historical assembly parts corresponding to two sample nodes in the complete assembly records, and determines a maximum value and a minimum value of the historical fit tolerance of the two types of historical assembly parts in the complete assembly records. The management platform designates a range formed by the maximum value and the minimum value as an actual fit tolerance of an edge corresponding to the two sample nodes in the sample assembly map. The sample nodes are the nodes in the sample assembly map. The actual fit tolerance corresponding to each edge in the sample assembly map is determined in the same manner described above.

The count of qualified parts refers to the count of parts to be assembled per unit of time that do not require rework. The unit time and required quality count are pre-set based on historical experience. The count of reworked products refers to the count of semi-finished products rejected in operation 270.

In some embodiments of the present disclosure, an input to the fit model includes assembly environment information.

The assembly environment information refers to information related to an environment of an assembly operation, for example, temperature, humidity, or the like. See FIG. 2 and its related descriptions for a description of the assembly operation.

In some embodiments of the present disclosure, the management platform obtains the assembly environment information from a temperature sensor, a humidity sensor, or the like of an IIoT sensing and control platform via an IIoT sensing network platform.

If the input to the fit model includes the assembly environment information, the training samples include sample assembly environment information. The sample assembly environment information is obtained in a manner similar to the manner in which the training samples are obtained.

In some embodiments of the present disclosure, different assembly environments may cause deformation of the parts to be assembled, and inputting the assembly environment information into the fit model can result in predicted fit tolerances that are more closely aligned with actual situations.

In some embodiments of the present disclosure, the fit model is trained by: inputting a plurality of training samples with labels into an initial fit model, constructing a loss function based on the labels and a prediction result of the initial fit model, and updating the initial fit model iteratively based on the loss function. When the loss function of the initial fit model meets a preset condition, the fit model training is completed. The preset conditions may include that the loss function converges, a count of iterations reaches a set value, or the like.

In some embodiments of the present disclosure, the fit model is acquired through incremental training based on the assembly quality, the incremental training includes: in response to determining that the assembly quality satisfies a predetermined training condition, the management platform determines an incremental training set based on a historical assembly record corresponding to the assembly quality, and performs an incremental update on the fit model based on the incremental training set. See FIG. 2 and its related descriptions for a description of the assembly quality.

The predetermined training condition refers to a condition for determining whether or not to perform the incremental training. In some embodiments of the present disclosure, the predetermined training condition includes that, within the complete assembly records during a preset period, a proportion of complete assembly records with nonconforming assembly quality to a total count of complete assembly records exceeds a preset ratio. The preset ratio is pre-set based on an assembly risk value; the higher the assembly risk value is, the higher the preset ratio is. The preset period refers to a time period between the last determination of the incremental training set and the current moment. More descriptions of the assembly risk value may be found in FIGS. 2 and 3 and the related descriptions thereof.

In some embodiments of the present disclosure, the management platform determines new training data and labels based on historical assembly records within the preset period using the above manner for determining the training samples and labels, thereby forming an incremental training set.

In some embodiments of the present disclosure, the management platform performs an incremental update on the fit model based on the incremental training set. A learning rate of the fit model at the time of the incremental update is lower than a learning rate of the fit model before the incremental update. The incremental update means retraining the fit model based on the incremental training set.

In some embodiments of the present disclosure, the accuracy of the fit model can be effectively improved by the incremental training. In addition, since the incremental training is carried out when the assembly quality is nonconforming, reducing the learning rate of the fit model during the incremental update can avoid omitting optimal parameters of the fit model.

In some embodiments of the present disclosure, the management platform determines the first assembly parameter based on predicted fit tolerances corresponding to the plurality of candidate assembly sequences. For example, for each of the plurality of candidate assembly sequence, the management platform designates a maximum value of a plurality of predicted fit tolerances corresponding to the candidate assembly sequence as an upper limit of a predicted fit tolerance range and a minimum value of the plurality of predicted fit tolerances corresponding to the candidate assembly sequence as a lower limit of the predicted fit tolerance range. The management platform selects a candidate assembly sequence with a widest predicted fit tolerance range as the assembly sequence parameter. The widest predicted fit tolerance range refers to predicted fit tolerance range in which a difference between the upper limit and the lower limit is the largest.

In some embodiments of the present disclosure, if the fit tolerance is too small, it may lead to difficulty in assembling, which may lead to a higher error rate or inefficient assembling. Therefore, determining the optimal predicted fit tolerance through the fit model ensures assembling efficiency and reduces the assembly risk value.

Some embodiments of the present disclosure further provide a non-transitory computer-readable storage medium. The storage medium stores computer instructions, and when a computer reads the computer instructions in the storage medium, the computer executes the method described in any of the above embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

It should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the count of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for assembly quality control based on Industrial Internet of Things (IIoT), the method being executed by an IIoT management platform of an IIoT system for assembly quality control, and the method comprising:
    obtaining, based on an IIoT sensing network platform, quality inspection information of a plurality of parts to be assembled through a quality inspection device of an IIoT sensing and control platform;
    determining, based on the quality inspection information and assembly information, an assembly risk value of each of at least one assembly process through an assembly database, the assembly database being configured in a data center of the IIoT management platform;
    determining that the assembly risk value satisfies a risk condition;
    generating a first assembly parameter in response to determining that the assembly risk value satisfies the risk condition, including:
        determining a part to be assembled with a highest assembly degree as a center part, wherein the assembly degree refers to a count of types of parts to be assembled that are assembled with a single part to be assembled;
        determining a reference fit tolerance range of each type of parts to be assembled with the center part based on a historical assembly record;
        selecting at least one part to be assembled from the each type of parts to be assembled whose fit tolerance with the center part is within the reference fit tolerance range;
        randomly selecting a part to be assembled from the at least one part to be assembled as a fit part of the center part;
        determining the first assembly parameter based on the fit part; wherein
    the first assembly parameter includes an assembly sequence parameter, and the method further comprises:
    determining a set of parts based on a type of the plurality of parts to be assembled;
    determining a plurality of sub-sets of parts based on the quality inspection information of the plurality of parts to be assembled in the set of parts;
    generating a plurality of candidate assembly sequences based on the assembly information;
    for each of the plurality of candidate assembly sequences:
        constructing, based on a plurality of sets of parts, the plurality of sub-sets of parts, and the candidate assembly sequence, an assembly map corresponding to the candidate assembly sequence;
        determining, based on the assembly map corresponding to the candidate assembly sequence, a predicted fit tolerance corresponding to the candidate assembly sequence through a fit model;
    determining a first assembly sequence parameter based on a plurality of predicted fit tolerances corresponding to the plurality of candidate assembly sequences;
    sending the first assembly parameter to an operation device of the IIoT sensing and control platform, and controlling the operation device to perform an assembly operation on the plurality of parts to be assembled based on the first assembly parameter;
    obtaining assembly process data of the assembly operation based on a monitoring device of the IIoT sensing and control platform;
    determining assembly quality of a completed process based on the assembly process data;
    in response to determining that the assembly quality does not satisfy a quality requirement, determining a second assembly parameter based on the assembly quality, and sending the second assembly parameter to a subsequent operation device of the IIoT sensing and control platform, so as to update an original assembly parameter of the subsequent operation device;
    generating quality warning information based on the assembly quality and the second assembly parameter, and sending the quality warning information to an IIoT user platform based on an IIoT service platform; and
    generating, based on the completed process, quality update data for updating the assembly database.

2. The method of claim 1, wherein the determining, based on the quality inspection information and assembly information, an assembly risk value of each of at least one assembly process through an assembly database includes:
    generating a plurality of candidate assembly groups based on the assembly information;
    for each of the plurality of candidate assembly groups, determining, based on quality inspection information of a plurality of parts to be assembled in the candidate assembly group, predicted assembly quality of the candidate assembly group via the assembly database; and
    determining the assembly risk value based on predicted assembly quality of the plurality of candidate assembly groups.

3. The method of claim 2, wherein
a count of the plurality of sub-sets of parts is related to the quality inspection information of the plurality of parts to be assembled in the set of parts, the quality inspection information includes a machining accuracy and a surface roughness; and
the generating a plurality of candidate assembly groups based on the assembly information includes:
    determining the plurality of candidate assembly groups based on the plurality of sub-sets of parts.

4. The method of claim 2, wherein for each of the plurality of candidate assembly groups, determining, based on the quality inspection information of the plurality of parts to be assembled in the candidate assembly group, the predicted assembly quality of the candidate assembly group via the assembly database includes:
    for each of the plurality of candidate assembly groups, determining a plurality of reference assembly records through the assembly database based on the quality inspection information of the plurality of parts to be assembled in the candidate assembly group; and determining, based on the plurality of reference assembly records, the predicted assembly quality of the candidate assembly group.

5. An Industrial Internet of Things (IIoT) system for assembly quality control, comprising an IIoT user platform, an IIoT service platform, an IIoT management platform, an IIoT sensing network platform, and an IIoT sensing and control platform, wherein the IIoT management platform includes a processor and a storage device, and the IIoT management platform is configured to:

obtain, based on the IIoT sensing network platform, quality inspection information of a plurality of parts to be assembled through a quality inspection device of the IIoT sensing and control platform;

determine, based on the quality inspection information and assembly information, an assembly risk value of each of at least one assembly process through an assembly database, the assembly database being configured in a data center of the IIoT management platform;

generate a first assembly parameter in response to determining that the assembly risk value satisfies a risk condition, wherein to determine the first assembly parameter, the IIoT management platform is further configured to:

determine a part to be assembled with a highest assembly degree as a center part, wherein the assembly degree refers to a count of types of parts to be assembled that are assembled with a single part to be assembled;

determine a reference fit tolerance range of each type of parts to be assembled with the center part based on a historical assembly record;

select at least one part to be assembled from the each type of parts to be assembled whose fit tolerance with the center part is within the reference fit tolerance range;

randomly select a part to be assembled from the at least one part to be assembled as a fit part of the center part;

determine the first assembly parameter based on the fit part; wherein the first assembly parameter includes an assembly sequence parameter, and the IIoT management platform is further configured to:

determine a set of parts based on a type of the plurality of parts to be assembled;

determine a plurality of sub-sets of parts based on the quality inspection information of the plurality of parts to be assembled in the set of parts;

generate a plurality of candidate assembly sequences based on the assembly information;

for each of the plurality of candidate assembly sequences:

construct, based on a plurality of sets of parts, the plurality of sub-sets of parts, and the candidate assembly sequence, an assembly map corresponding to the candidate assembly sequence;

determine, based on the assembly map corresponding to the candidate assembly sequence, a predicted fit tolerance corresponding to the candidate assembly sequence through a fit model;

determine a first assembly sequence parameter based on a plurality of predicted fit tolerances corresponding to the plurality of candidate assembly sequences;

send the first assembly parameter to an operation device of the IIoT sensing and control platform, and control the operation device to perform an assembly operation on the plurality of parts to be assembled based on the first assembly parameter;

obtain assembly process data of the assembly operation based on a monitoring device of the IIoT sensing and control platform;

determine assembly quality of a completed process based on the assembly process data;

in response to determining that the assembly quality does not satisfy a quality requirement, determine a second assembly parameter based on the assembly quality, and send the second assembly parameter to a subsequent operation device of the IIoT sensing and control platform, so as to update an original assembly parameter of the subsequent operation device;

generate quality warning information based on the assembly quality and the second assembly parameter, and send the quality warning information to the IIoT user platform based on the IIoT service platform; and generate, based on the completed process, quality update data for updating the assembly database.

6. The system of claim 5, wherein the IIoT management platform is further configured to:

generate a plurality of candidate assembly groups based on the assembly information;

for each of the plurality of candidate assembly groups, determine, based on quality inspection information of a plurality of parts to be assembled in the candidate assembly groups, predicted assembly quality of the candidate assembly group via the assembly database; and determine the assembly risk value based on predicted assembly quality of the plurality of candidate assembly groups.

7. The system of claim 6, wherein the IIoT management platform is further configured to:

for each of the plurality of candidate assembly groups, determine a plurality of reference assembly records through the assembly database based on the quality inspection information of the plurality of parts to be assembled in the candidate assembly group; and determine, based on the plurality of reference assembly records, the predicted assembly quality of the candidate assembly group.

8. A non-transitory computer-readable storage medium storing computer instructions, wherein when reading the computer instructions in the storage medium, a computer implements a method for assembly quality control based on Industrial Internet of Things (IIoT), the method being executed by an IIoT management platform of an IIoT system for assembly quality control, and the method comprising:

obtaining, based on an IIoT sensing network platform, quality inspection information of a plurality of parts to be assembled through a quality inspection device of an IIoT sensing and control platform;

determining, based on the quality inspection information and assembly information, an assembly risk value of each of at least one assembly process through an assembly database, the assembly database being configured in a data center of the IIoT management platform;

generating a first assembly parameter in response to determining that the assembly risk value satisfies a risk condition, including:
    determining a part to be assembled with a highest assembly degree as a center part, wherein the assembly degree refers to a count of types of parts to be assembled that are assembled with a single part to be assembled;
    determining a reference fit tolerance range of each type of parts to be assembled with the center part based on a historical assembly record;
    selecting at least one part to be assembled from the each type of parts to be assembled whose fit tolerance with the center part is within the reference fit tolerance range;
    randomly selecting a part to be assembled from the at least one part to be assembled as a fit part of the center part;
    determining the first assembly parameter based on the fit part; wherein
the first assembly parameter includes an assembly sequence parameter, and the method further comprises:
determining a set of parts based on a type of the plurality of parts to be assembled;
determining a plurality of sub-sets of parts based on the quality inspection information of the plurality of parts to be assembled in the set of parts;
generating a plurality of candidate assembly sequences based on the assembly information;
for each of the plurality of candidate assembly sequences:
    constructing, based on a plurality of sets of parts, the plurality of sub-sets of parts, and the candidate assembly sequence, an assembly map corresponding to the candidate assembly sequence;
    determining, based on the assembly map corresponding to the candidate assembly sequence, a predicted fit tolerance corresponding to the candidate assembly sequence through a fit model;
determining a first assembly sequence parameter based on a plurality of predicted fit tolerances corresponding to the plurality of candidate assembly sequences;
sending the first assembly parameter to an operation device of the IIoT sensing and control platform, and controlling the operation device to perform an assembly operation on the plurality of parts to be assembled based on the first assembly parameter;
obtaining assembly process data of the assembly operation based on a monitoring device of the IIoT sensing and control platform;
determining assembly quality of a completed process based on the assembly process data;
in response to determining that the assembly quality does not satisfy a quality requirement, determining a second assembly parameter based on the assembly quality, and sending the second assembly parameter to a subsequent operation device of the IIoT sensing and control platform, so as to update an original assembly parameter of the subsequent operation device;
generating quality warning information based on the assembly quality and the second assembly parameter, and sending the quality warning information to an IIoT user platform based on an IIoT service platform; and
generating, based on the completed process, quality update data for updating the assembly database.

* * * * *